April 16, 1968

R. E. MILLER ETAL 3,378,120

CLUTCH AND BRAKE WITH NON-ROTATABLE FLUID OPERATOR

Original Filed May 28, 1965

INVENTORS
ROY E. MILLER, AND
BY ROBERT F. MILLER

Linton and Linton

ATTORNEYS.

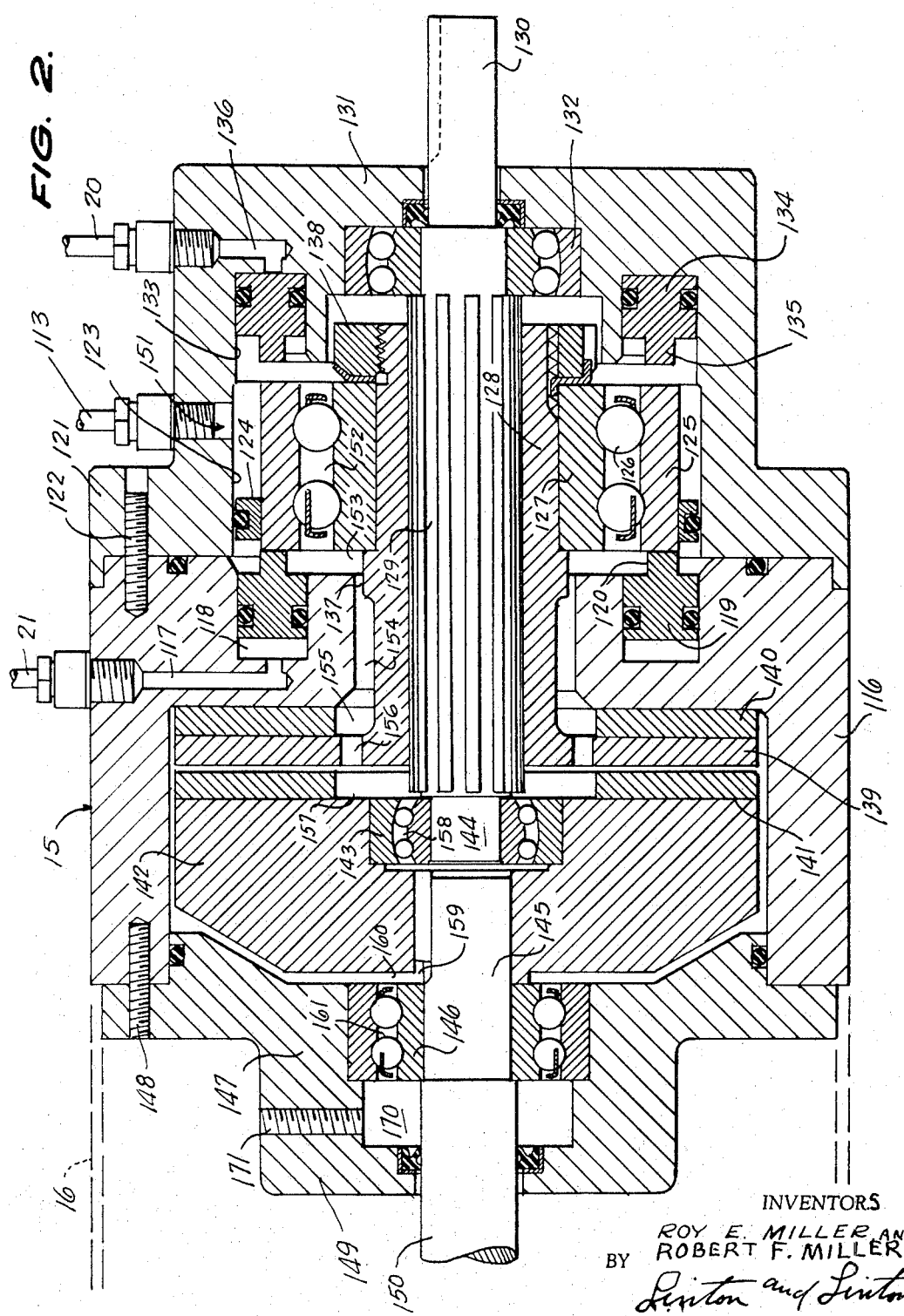

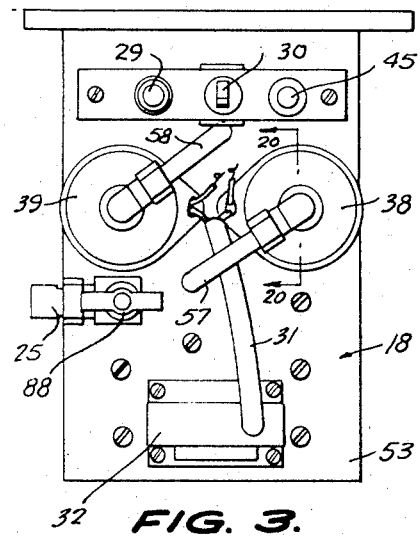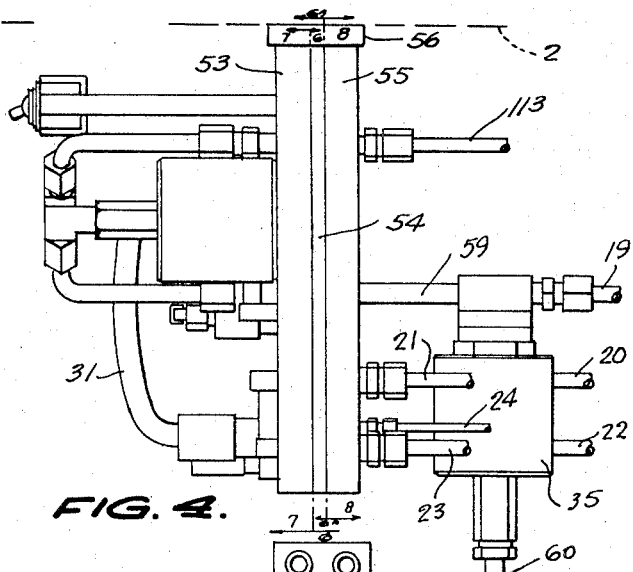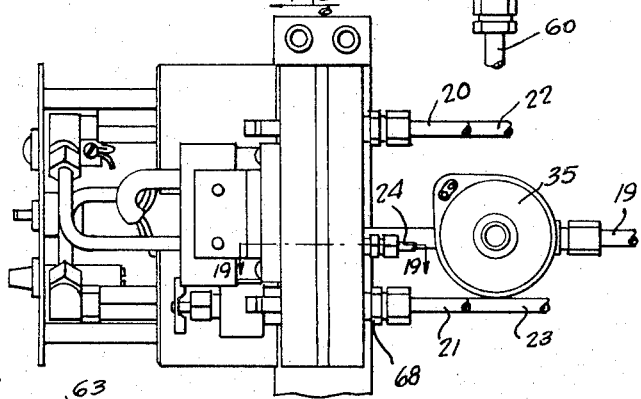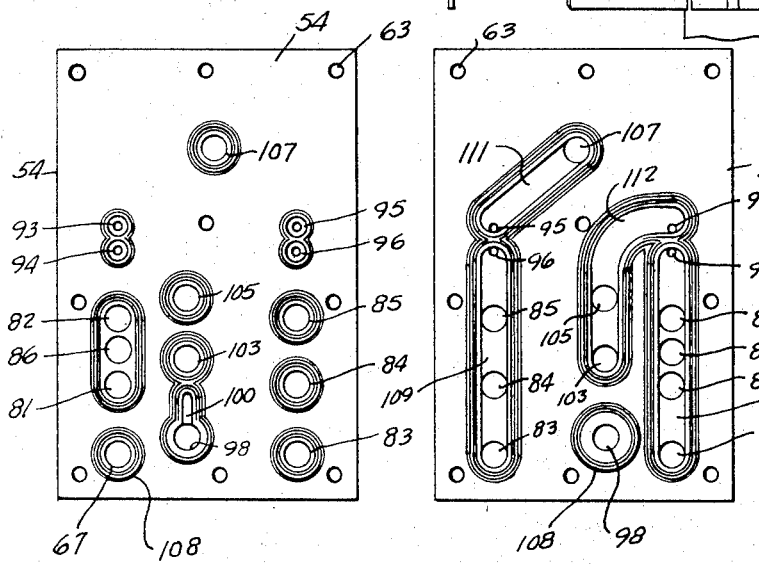

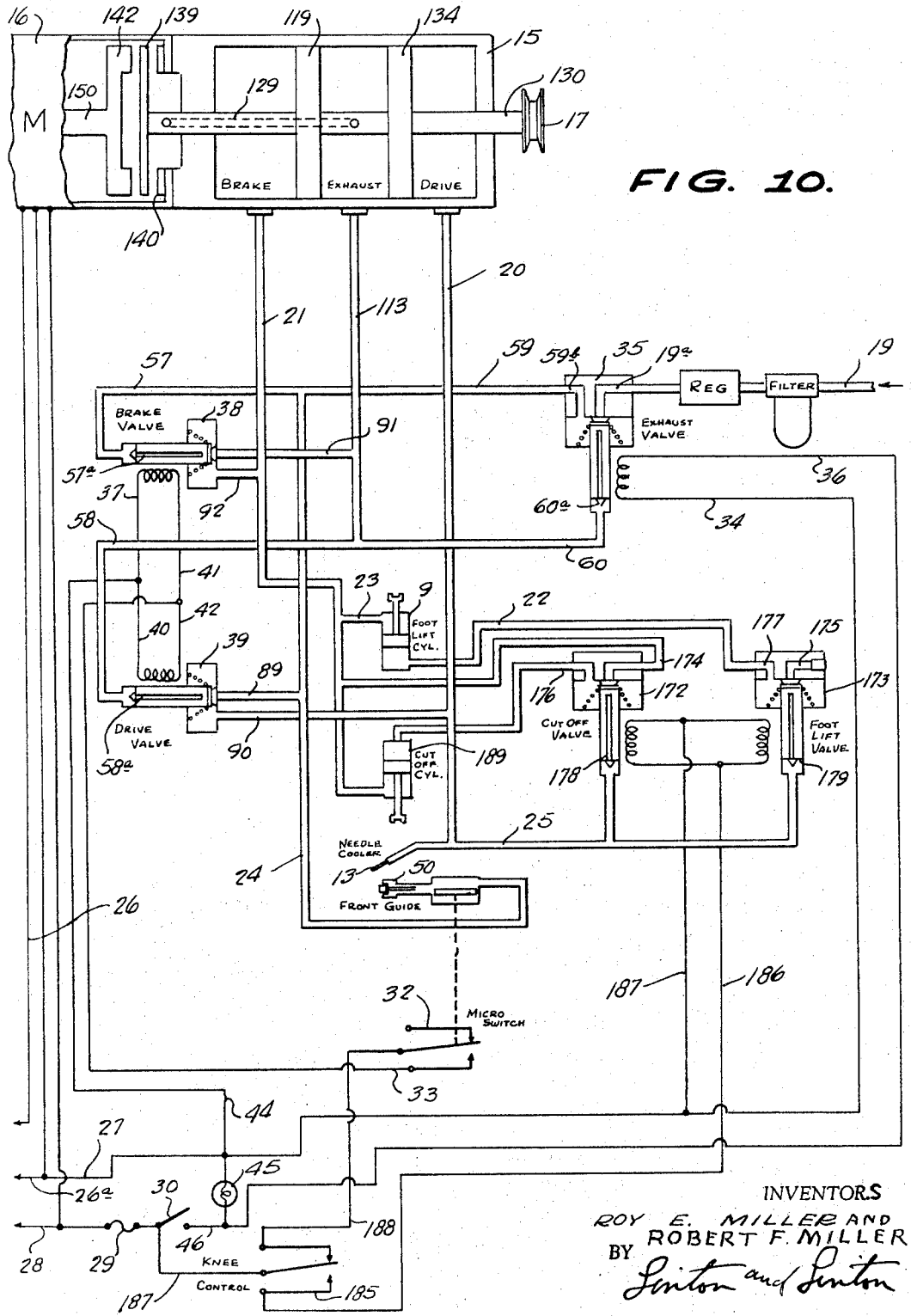

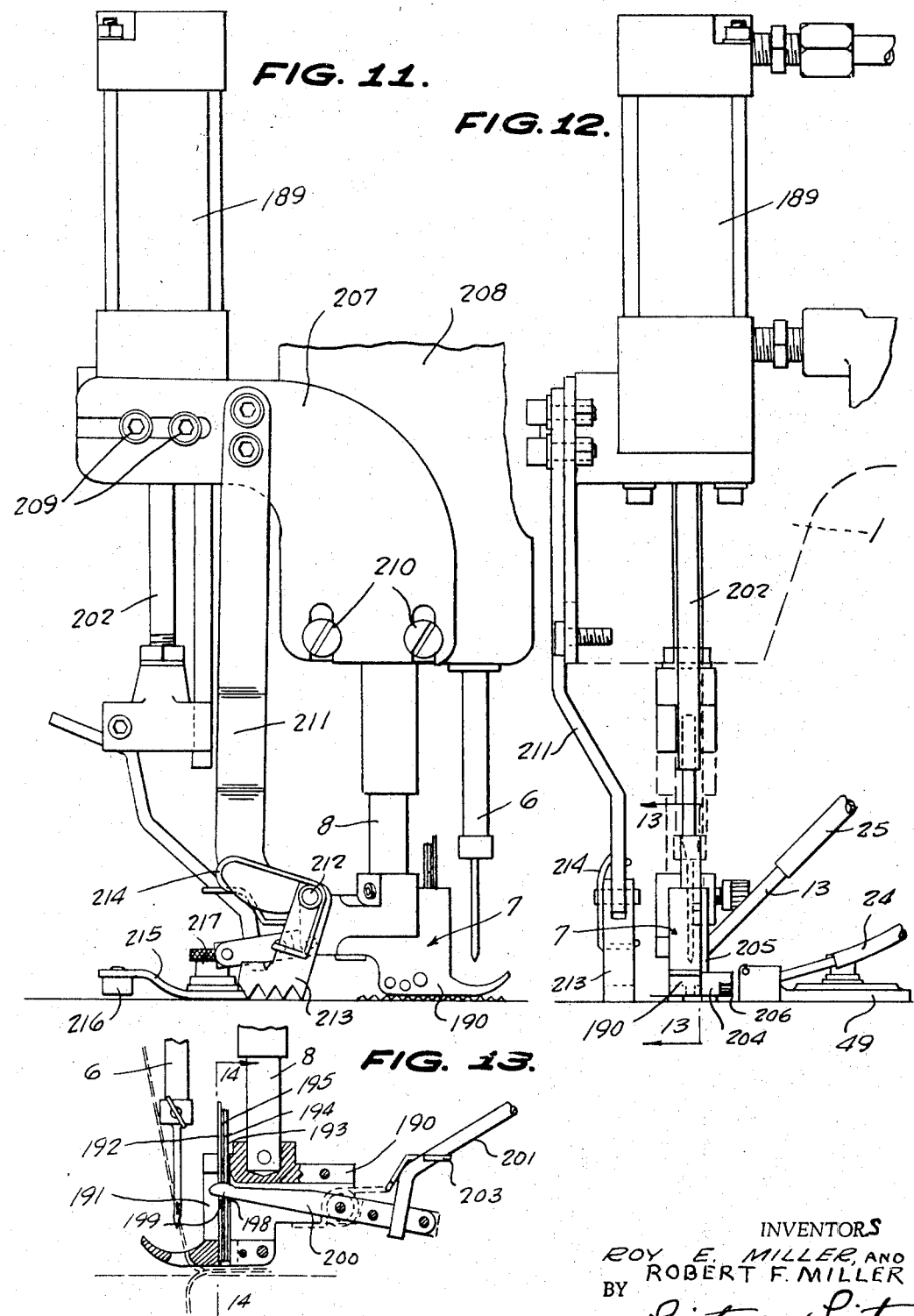

April 16, 1968 R. E. MILLER ET AL 3,378,120
CLUTCH AND BRAKE WITH NON-ROTATABLE FLUID OPERATOR
Original Filed May 28, 1965 6 Sheets-Sheet 6

INVENTORS
ROY E. MILLER AND
BY ROBERT F. MILLER

Linton and Linton
ATTORNEYS.

United States Patent Office 3,378,120
Patented Apr. 16, 1968

1

3,378,120
CLUTCH AND BRAKE WITH NON-ROTATABLE FLUID OPERATOR
Roy E. Miller and Robert F. Miller, Mechanicsburg, Pa., assignors to General Automated Machinery Corporation, Camp Hill, Pa., a corporation of Pennsylvania
Original application May 28, 1965, Ser. No. 459,638. Divided and this application July 11, 1967, Ser. No. 652,609
4 Claims. (Cl. 192—14)

ABSTRACT OF THE DISCLOSURE

The present application is a divisional application of applicants co-pending application Ser. No. 549,638 filed May 28, 1965 relative to a work controlled system for operating a sewing machine and associated elements, and the present application is particularly concerned with an air operated combination clutch and brake unit having a driven shaft, a drive shaft, and plates for being alternately engaged to connect said shafts or to stop the rotation of the driven shaft. A plate keyed, but slideably mounted on the driven shaft is slid in opposite directions therealong by air operated pistons whereby said plate can engage a plate carried by the drive shaft or alternately a fixed plate for stopping said driven shaft.

---

The principal object of the invention is to provide a system controlled by the advancing of a piece of work for operating a sewing machine and associated elements for sewing the work piece and which system will, in the proper order, start and drive the sewing machine, lower the presser foot and thread cut-off, sever the thread at the completion of the sewing of one work piece and introduction of a second work piece to the sewing machine, cool the needle, raise the presser foot and thread cut-off and stop the sewing machine solely through the feeding of the work piece during the sewing thereof.

It is a further important object of the invention to provide an air operated combination clutch and brake in a unit which is quick in its operation, is rugged and long lasting, is relatively economical to produce, is compact requiring a minimum amount of space, can be readily assembled or disassembled without requiring special skill or tools and yet can be quickly and easily connected to various types of driving means and out-put elements.

Further objects of the invention will be in part obvious and in part pointed out in the following detailed description of the accompanying drawings in which:

FIG. 2 is an enlarged detail longitudinal sectional view of the present clutch taken on line 2—2 of FIG. 1.

FIG. 3 is an enlarged front view of a switching unit providing part of the present system.

FIG. 4 is a side elevation of said switching unit taken from the right of FIG. 3.

FIG. 5 is a top view of said switching unit.

FIG. 6 is a front elevation of the center plate of said switching unit taken along line 6—6 of FIG. 4.

FIG. 6a is a rear view of said center plate.

2

FIG. 10 is a diagrammatic view of the electrical and pneumatic system of the present invention.

FIG. 11 is an enlarged front elevation of the presser foot and thread cut-off forming a part of the invention.

FIG. 12 is an enlarged side elevation taken to the right of FIG. 11 and showing the sewing machine head in broken lines.

FIG. 13 is a cross-sectional view taken on line 13—13 of FIG. 12.

Figure 14:
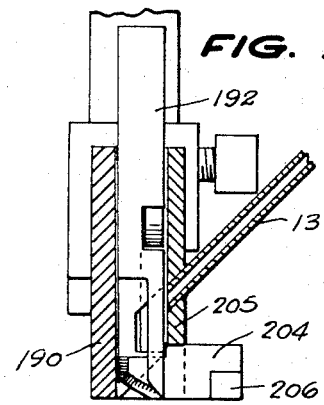

FIG. 14 is a cross-sectional view taken on line 14—14 of FIG. 13.

Figure 15:
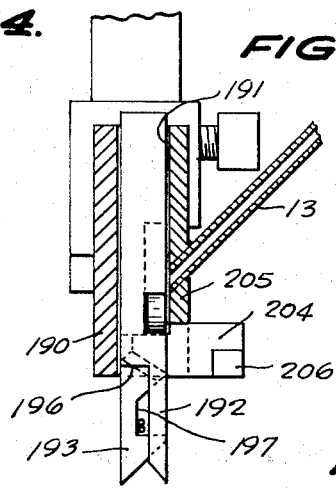

FIG. 15 is a view similar to FIG. 14, but with the thread pick-up and thread retainer in their down position.

Figure 16:
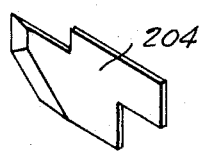

FIG. 16 is an enlarged perspective view of the thread cutter plate.

Figure 17:
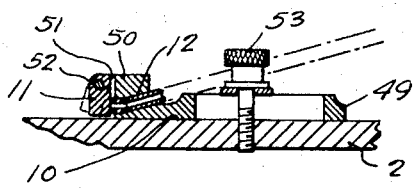

FIG. 17 is a longitudinal sectional view of the control unit.

Figure 18:
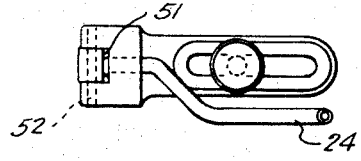

FIG. 18 is a top view of said control unit.

Figure 19:
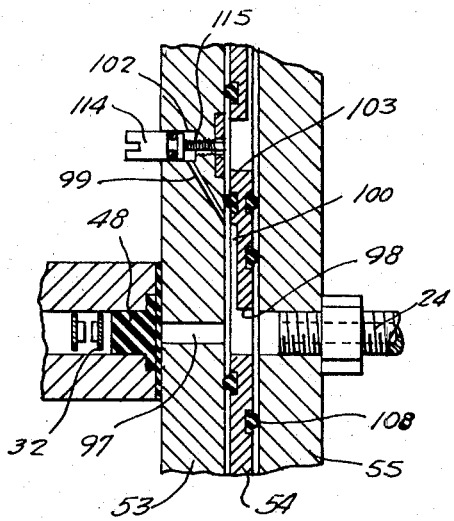
Figure 20:
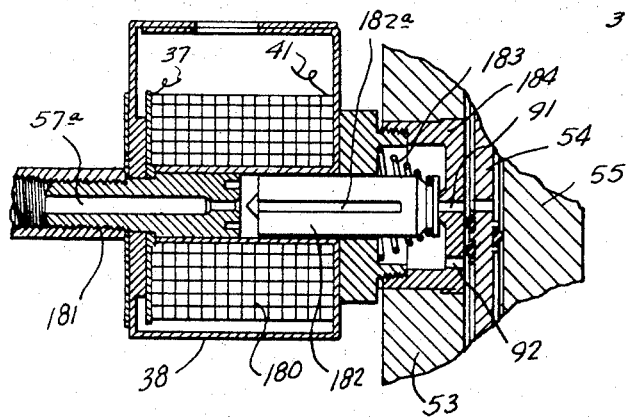

FIG. 19 is an enlarged cross-sectional view taken on line 19—19 of FIG. 5, and;

FIG. 20 is an enlarged partial cross-sectional view taken on line 20—20 of FIG. 3.

Referring now more particularly to the accompanying drawings in which like and corresponding parts are designated by similar reference characters, numeral 1 generally indicates a conventional lock stitch sewing machine, for example those employed in sewing parts of shoes such as for example model 262 manufactured by the Singer Sewing Machine Co., and Union Special 51200 manufactured by the Union Special Machine Co., mounted upon a base 2 having a drive shaft pulley 3 around which extends an endless belt 4. Thread 5 is fed to needle 6 adjacent presser foot and thread cut-off 7 which is connected to the conventional presser foot rod 8 and the presser foot lift mechanism controlled by cylinder 9 and carried by the head of the sewing machine as will be described more in detail hereinafter.

Control unit generally indicated by 10 and individually shown in FIG. 17 and 18 is mounted on base 2 and has a bar 11 pivotally mounted on one end thereof extending across passageway 12 which passageway is connected to tube 24.

Figure 1:
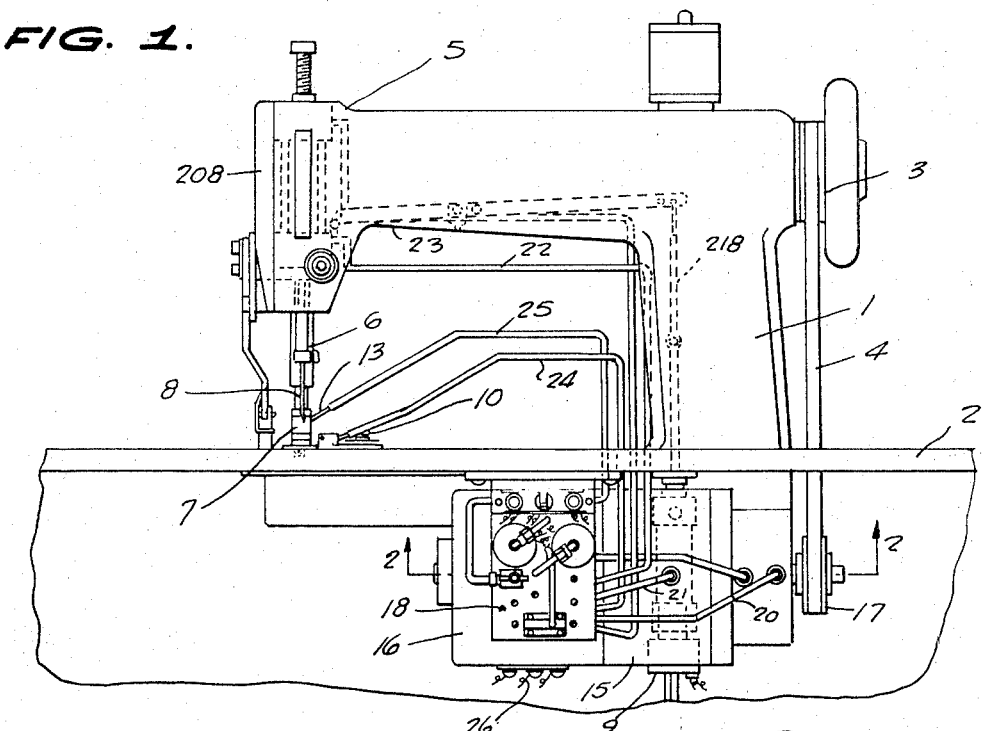
FIG. 1 is a side elevation of a sewing machine with the present system and clutch associated therewith.
Figure 7:
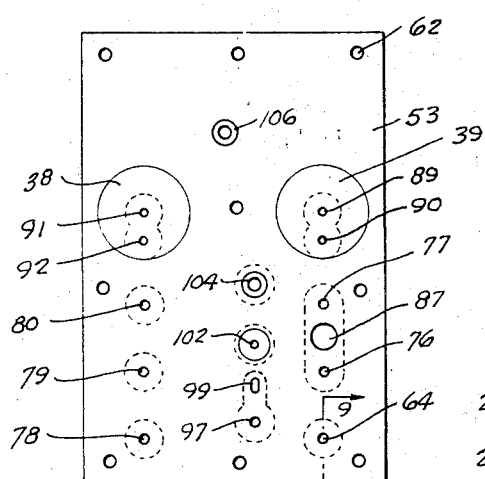
FIG. 7 is an elevation of the back of the front piece of said switching unit taken along line 7—7 of FIG. 4.
Figure 8:
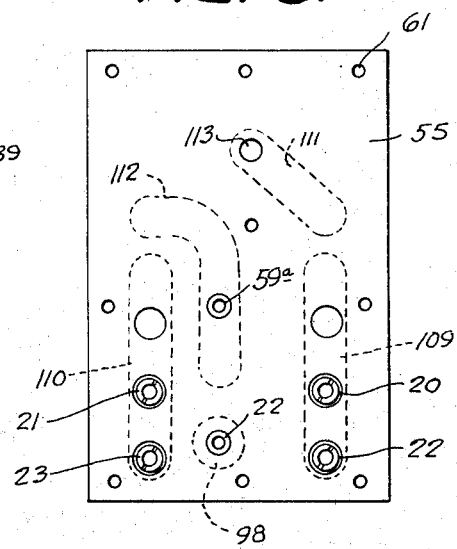
FIG. 8 is an elevation of the back of the back plate of said switching unit taken along line 8—8 of FIG. 4.

An air tube 13 as shown in FIG. 1, 14 and 15 is connected to said presser foot and thread cut-off 7 for supplying cooler air thereto.

A combination clutch and brake unit 15 is mounted beneath base 2 and is connected to an electric motor 16. Pulley 17 of said clutch and brake unit has belt 4 passing therearound.

A switching unit 18 is also mounted beneath base 2 and is connected to a compressed air inlet pipe 19 which is connected to a source of compressed air not shown.

Tube 20 connects switching unit 18 with the clutch of said clutch and brake unit while tube 21 connects unit 18 to the brake of unit 15. Tube 22 connects unit 18 to the presser foot lowering side of cylinder 9 while tube 23 connects unit 18 to the presser foot raising side of cylinder 9.

Tube 24 connects unit 18 to control unit passage 12 and tube 25 connects unit 18 to air tube 13.

An electrical circuit 26 connects motor 16 to a source of electrical current. Lines 27 and 28 are also connected to said circuit while line 28 is connected to fuse 29, switch 30 and by line 46 to pilot light 45. Line 33 connects one pole of a microswitch 32 to line 43. Line 34 is connected to line 27 and to one pole of solenoid 35 whose other pole is connected to line 36 and pilot light 45. Line 40 joins one pole of solenoid 39 to line 44 and also line 37 connected to one pole of solenoid 38 while the second poles of said solenoids 38 and 39 are connected by lines 41 and 42 to line 33.

Microswitch 32 is normally open and is closed by the upward movement of a resilient diaphragm 48, see FIG. 19.

Control unit 10 has a slotted base plate 49 adjustably mounted on base 2 and includes a block 50 through which passageway 12 extends on a downward slant and through an opening in end recess 50 in which bar 11 is pivotally positioned. A pin 52 extending through block 50 and bar 11 pivotally connects the same. A thumb screw 53 extends through the slotted plate 49 and is in threaded engagement with base 2 for adjustably retaining plate 49 on base 2.

Switching unit 18 has three superimposed plates, front plate 53, center plate 54 and back plate 55 held together by screws therethrough and base plate 56 connected thereto by screws and also to base 2.

A tube 57 connects the bore 57a of solenoid 38 with opening 104 in said front plate. Tube 58 connects the bore 58a of solenoid 39 with opening 106 of said front plate. An inlet pipe 59 connects air pipe 19 to opening 59a in back plate 55 and solenoid 35 is connected between pipes 19 and 59 for controlling the air inlet and for at times exhausting air from pipe 59 to exhaust pipe 60.

Plates 55, 53 and 54 have a series of corresponding openings 61, 62 and 63 through which screws extend for joining said plates together.

Figure 9:
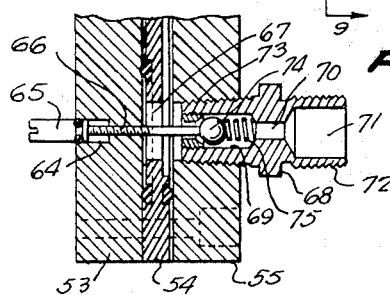
FIG. 9 is an enlarged detail cross-sectional view taken on line 9—9 of FIG. 7 and showing a portion of said switching unit and a pressure limiting valve forming a part thereof.

As shown in FIG. 9 plate 53 has a threaded stepped opening 64 into which extends screw 65 having a threaded shank 66 extending through opening 67 in plate 54 into nipple 68 connected to tube 23. Said nipple 68 has bores 69, 70 and 71 with exterior threads 72 for receiving a conventional tube connector for joining tube 23 thereto. A ring 73 retains ball 74 in bore 69 against spring 75 while screw 66 adjusts the position of said ball relative to ring 73. Similarly openings 76, 78 and 79 in plate 53 have screws 64a, 65b, and 65c extending therein and through openings 81, 83, and 84 respectively in center plate 54 into valved nipples similar to nipple 68 for tubes 21, 22 and 20 respectively connected to and through back plate 55.

Front plate 53 has opening 87 connected to screw valve 88 connected to tube 25 and which opening 87 coincides with oepning 86 in said center plate.

Solenoid 39 has a center opening 89 and side opening 90 through plate 53 while solenoid 38 has center opening 91 and side opening 92 through said plate. Said openings 89, 90, 91, and 92 open into openings 93, 94, 95, and 96 respectively of center plate 54.

Front plate opening 97 opens into piston 48 of said mircroswitch and opening 98 of center plate 54. As shown in FIG. 19 a slanting passage 99 in front plate 53 is connected by recess 100 in said center plate to opening 98. Further, passage 99 opens into opening 102 of said front plate coinciding with opening 103 of said center plate.

Opening 104 of said front plate has tube 57 connected thereto and opens into opening 105 of said center plate. Opening 106 of said front plate is connected to tube 58 and opens into opening 107 of said center plate and tube 113 connected to said back plate.

Rubber rings such as 108 are embedded in the front of center plate 54 around the openings as indicated in the drawing. The back of said center plate has recesses 109, 110, 111, and 112 each joining openings 83, 84, 85, and 96, openings 67, 81, 86, 82 and 94, openings 95 and 107 and openings 103, 105, and 93 respectively with each recess as well as opening 98 being surrounded by a rubber ring 108 embedded in the back of the center plate.

As shown in FIG. 19 front plate opening 102 has a screw 114 threaded in bore 115 for controlling the end of passage 99.

The clutch and brake unit 15 shown in detail in FIG. 2 has an annular housing 116 with air passage 117 connected to tube 21 and annular cylinder 118 in the end face of said housing. An annular piston 119 is slideably mounted in cylinder 118 and has an annular extension 120.

A cylindrical cap 121 is fastened by bolts 122 to said housing end face and within its bore 123 has a sealing ring 124 surrounding a ball bearing 125 with balls 126 riding on inner race 127 surrounding sleeve 128 through which extends splined shaft 129 having a driven shaft 130 exteriorly of the base 131 of cap 121 as a part thereof.

A roller bearing 132 embedded in base 131 rotatably supports one end of shaft 129. Said base further has an annular cylinder 133 provided on the inner face thereof in which is slideably positioned an annular piston 134 having an annular extension 135. An air passage 136 connected to tube 20 extends into cylinder 133 behind said piston 134.

Sleeve 128 has a peripheral flange 137 forming an inner stop for one end of race 127 and a ring 138 in threaded engagement with said sleeve holding said race against said stop. Said sleeve further has a lateral annular flange 139 positioned between an annular plate 140 of conventional brake lining material fixedly connected in any conventional manner to housing 116 and similar annular plate 141 of brake lining material fixedly connected in a similar manner to an annular block 142.

A ball bearing 143 is embedded in block 142 and has end 144 of shaft 129 extending therein rotatably supporting that end of said shaft. A stub shaft 145 is rotatably supported by a roller bearing 146 embedded in cap 147 fixedly connected to other end face of housing 116 by bolts 148. The base 149 of cap 147 has a drive shaft 150 extending from motor 16 rotatably mounted therethrough of which stub shaft 145 is an extension.

Cap 131 has threaded opening 151 connected to tube 113 and their exhaust openings 60, 58 and 91 of solenoids 35, 39 and 38 respectively. Opening 151 opens in the cap bore 123 for feeding exhausted air to connected passages 133, 152, to 161 inclusive and 170 and to threaded opening 171 in cap 147 from which the air is exhausted.

Solenoids 35, 39 and 172 and 173 are conventional electrically operated three way solenoid air valves each with a strong spring, while solenoid 38 is a conventional electrically operated three way solenoid air valve with a relatively weak spring. Ports 60a, 57a, 58a, 178 and 179 as well as 59b, 92, 90, 176 and 177 of said solenoids are normally open. Such solenoids can be solenoid air valves for example such as those manufactured by the Automatic Switch Company, Florham Park, New Jersey, Catalogue Nos. GX8314A33 and GX8314A51.

FIG. 20 of the drawings discloses in cross section the solenoid 38 by way of an example of the aforementioned solenoids 35, 39, 172 and 173 which are similar to this solenoid 38. Said solenoid has electrical coil 80 connected to lines 37 and 41 with a fixed tube 181 extending into the bore of said coil and having a bore 57a in communication with tube 57. A slidable iron core 182 also extends within the bore of coil 180 in line with tube 181 while a spring 182 tends to move said core from said coil against cup 184 fixedly mounted in plate 53, across opening 91 in said cup. Said cup further has opening 92 which is in communication with bore 57a in tube 181 due to a longitudinal groove 182a in the side wall of core 182. When coil 180 is electrically energized it draws core 182 against tube 181 closing bore 57a and bringing openings 91 and 92 in communication.

A knee control microswitch 185 is mounted upon a support for and below top 2. Said switch is connected by line 186 to one pole of both the cutoff solenoid valve 172 and to foot lift solenoid 173 as well as to switch 30 by line 187 and microswitch 32 by line 188. The other pole of said solenoid valves 172 and 173 are connected by lines 187 and 34 to pilot light 45. Said microswitch 185 is normally open and when closed by the operator activates both said solenoids 172 and 173 opening port 174 of solenoid 172 and closing ports 178 and 179 of both solenoids 172 and 173.

Solenoid 172 has normally open port 178 in communication with tube 20 and normally open port 176 in communication with the down piston positioning side of the cutoff cylinder 189 and normally closed port 175 in communication with both tube 21 and the up piston positioning side of said cutoff cylinder 189.

Solenoid 172 has normally open port 179 in communication with tube 20 and normally open port 177 in communication with the down piston positioning side of the foot lift cylinder 9.

The presser foot and thread cutoff 7 includes the presser foot body 190 which has a vertical recess in which is slideably positioned the thread retainer 192 alongside of a pair of plates 193 and 194 with hooked ends and a spacer 195 therebetween providing the thread pickup. Said thread retainer 192 has a side slot 196 in line with slots 197 and 198 in the thread pickup plates in which is positioned an end 199 of an arm 200 pivotally connected to said presser foot body. A curved rod 201 is fixedly connected to the other end of said arm and positioned for being engaged by the piston rod 202 of said cutoff cylinder 189 for being pushed downwardly to raise the thread retainer 192 and thread pick-up plates 193 and 194 into the presser foot body. A coil spring 203 is attached at one end to said presser foot body and bears against said curved rod to raise the same and thus lower the thread retainer and thread pick-up from said presser foot body. A thread cutting plate 204 extends between the plates of said thread pickup and across said presser foot body. A plate 205 encloses said elements within said presser foot body while a holder 206 fastened to said plate 205 retains said knife plate in position within said presser foot body.

An L-shaped plate 207 supports cylinder 189 by bolts 209 and said plate is fastened to the end 208 of the sewing machine 1 by screws 210. An L-shaped arm 211 is fixedly connected to plate 207 and extends downwardly therefrom and has a pin 212 upon which is pivotally mounted a dog 213 which is held against base 2 by spring 214.

An arm 215 rotatably supports a roller 216 above base 2 on the inner side but to the rear of the presser foot and thread cutoff 7. A thumb screw 217 extends through side arm 215 and is in threaded engagement with base 2 permitting the adjustment of the position of said arm.

Cylinder 9 has the piston rod thereof connected to the conventional presser foot lifting mechanism, generally indicated in FIG. 1 in dotted lines at 218, of the sewing machine 1 and is thereby connected to rod 8 for raising said rod 8 and thereby the presser foot and thread cutoff 7 when said cylinder is activated.

In the operation of the present system screws 65 to 65c inclusive are adjusted to move each ball 74 from its ring 73 to permit the correct amount of air to pass therethrough and this adjustment can be changed when found necessary.

The clutch and brake unit 15 has driven shaft 150 continuously rotating when motor 16 connected thereto is energized when switch 26a is closed.

When compressed air from switching unit 18 passes through tube 21, piston 119 as shown in FIG. 2 moves projection 120 against the outer race of ball bearing 125 moving sleeve 128 to the right of FIG. 2 and flange 139 against disc 140 braking the rotation of driven shaft 130, stopping the sewing machine.

However, when the switching unit 18 directs the compressed air to tube 20, piston 134 is moved to the left of FIG. 2 against the outer race of ball bearing 125 moving sleeve 128 and flange 139 to the left against disc 141 which is rotating with block 142 keyed to shaft 145 being rotated by shaft 150, causing shaft 129 and 130 to rotate therewith driving the sewing machine.

The space between flange 139 and disc 140 and 141 is very small so that the transition from brake to clutch engagement is very quickly carried out. Sleeve 128 has a grooved bore into which the splines on splined shaft 129 are slideably positioned permitting sleeve 128 to slide longitudinally of shaft 129 for rotating therewith.

The housing of motor 16 and the clutch and brake unit 15 are joined with the motor drive shaft being shaft 150 or fixedly connected thereto. However, it is to be appreciated that other driving means such as internal combustion engines or the like can be used for driving shaft 150 or connected thereto by any conventional means. Clutch and brake unit 15 can equally as well be used in other applications besides that of operating a sewing machine as described herein.

When switch 26a in lines 26 is closed it sends an electrical current to motor 16 for operating the same. At such time if switch 30 is closed it activates signal 45 and solenoid 35 closing port 60a thereof and opening port 19a to port 59b allowing compressed air from tube 19 to pass to tube 59, openings 59a, 105 and 104, tube 57, solenoid 38, opening 92, 96, recess 109, openings 84 and 83 and tubes 21 and 23 stopping the sewing machine and raising the presser foot 7, and also to the tube 24 for guide plate 11.

When a work piece such as a shoe is presented for sewing it is caused by the operator to press against plate 11 and then beneath needle 6 for closing passage 12 stopping the escape o fair increasing the pressure thereof whereupon the air enters openings 97 forcing piston 48 upwardly, closing microswitch 32 and completing the circuit to solenoids 38 and 39 which changes the air passing therethrough closing openings 57a and 58a and opening openings 91 and 89 of both solenoids. Thus tube 21 is exhausted through solenoid 38 to tube 113 and air passes from opening 89 to 90 of solenoid 39 to tube 20 closing the clutch and operating the sewing machine and also to ports 178 and 176 of solenoid 172 pushing down the piston in the cut-off cylinder raising the thread retainer and thread pick-up in the presser foot and thread cut-off 7, and 177 of solenoid 173 to cylinder 9 raising the piston therein thus lowering the presser foot and thread cut-off 7 onto the work piece.

When switches 26a and 30 are closed placing port 19a and 59a of solenoid 35 in communication and closing port 60a thereof compressed air therefrom passes through normally open ports 57a and 92 of solenoid 38 to tube 21 stopping the sewing machine and to the tube 23 raising the foot lift piston in cylinder 9 and also raising the piston in the cut-off cylinder 189. This raises the presser foot and thread cut-off as well as lowering the thread retainer and thread pick-up in the said presser foot and thread cut-off.

Upon microswitch 32 being closed port 57a of solenoid 38 is closed and port 91 opened exhausting said solenoid, tube 21 and the piston raising sides of said foot lift cylinder 9 and said cut-off cylinder 189 and releasing the brake. At the same time, port 58a of solenoid 39 is closed and port 89 thereof opened directing the air to tube 20 closing the clutch for operating the sewing machine, to the needle cooler tube 25, to ports 179 and 177 of solenoid 173 for moving the piston in cylinder 9 downwardly lowering presser foot and thread cut-off 7 and also to port 178 of solenoid 172 and through port 176 thereof to the down positioning side of the cutoff cylinder 189 raising the thread retainer and thread pickup of presser foot and thread cut-off 7 cutting the sewing thread.

At any time that the knee control microswitch 185 is activated ports 178 and 179 of solenoids 172 and 173 respectively are closed and port 174 of solenoid 172 opened.

Thus if microswitch 32 is closed when a shoe piece is against the front guide 11 and the sewing machine is operating due to port 89 and 90 of solenoid 39 being opened and said knee operated microswitch 185 is activated, ports 178 and 179 of solenoid 172 and 173 are closed while port 174 of solenoid 172 is opened without effecting the piston in the cut-off cylinder 189.

However, if microswitch 32 is not closed and air is passing through port 92 of solenoid 38 and the tube 21 stopping the operation of the sewing machine and then the knee operated microswitch 185 is closed, air passes to port 176 and 174 of solenoid 172 and both sides of the piston of the cut-off cylinder 189 so that there is no change in the thread retainer and thread pickup of the presser foot and thread cut-off and also to tube 23 to the up piston positioning side of cylinder 9 raising presser foot and thread cut-off 7.

Of course, opening the knee control microswitch 185 again deenergizes solenoids 172 and 173 returning the system to its normally operating condition.

The present apparatus can be also employed by using tubing as a substitute for the passageways of the switching unit 18.

The present apparatus is capable of considerable modifications and such changes thereto as come within the scope of the appended claims is deemed to be a part thereof.

We claim:

1. A combination clutch and brake unit comprising a housing, a drive shaft extending into said housing, a driven shaft also extending into said housing, a pair of spaced apart parallel friction discs in said housing with one disc fixedly connected to said drive shaft for rotation therewith and the other disc fixedly connected to said housing, a plate positioned between said discs, a sleeve slideably mounted on said driven shaft and keyed thereto for rotation therewith, a bearing slideably positioned in said housing and having said sleeve extending therethrough rotatably supporting said sleeve, stops carried by said sleeve on opposite sides of said bearing, said housing having a pair of cylinders each on an opposite side of said bearing, a pair of pistons each slideably positioned in one of said cylinders for abutting and pushing said bearing and thereby said sleeve and plate in opposite directions and a controlled source of pressurized media connected to said cylinders for moving one of said pistons at a time.

2. A combination clutch and brake unit comprising a housing consisting of a cylindrical center portion with a pair of caps each fixedly connected to an opposite end of said center portion and with an axial bore extending through said caps and center portion, a drive shaft extending through one of said caps axial bore, a driven shaft extending through the other cap axial bore and the center portion axial bore, a friction disc fixedly connected to said drive shaft and laterally thereof, a second friction disc fixedly mounted in said center portion parallel to, but spaced from said first disc, a plate positioned between said discs, a sleeve slideably mounted on said driven shaft and keyed thereto for rotation therewith and having said plate fixely mounted thereon, a bearing slideably mounted in said other cap and having said sleeve extending therethrough for being rotatably supported thereby, means for preventing a longitudinal sliding movement between said bearing and said sleeve, a cylinder provided in said center portion facing one side of said bearing, a piston slideably mounted in said cylinder for pushing said bearing, a second cylinder provided in said other cap facing an opposite side of said bearing, a second piston slideably mounted in said second cylinder for pushing said bearing in an opposite direction to said first piston, means for at times supplying pressurized media to said first cylinder for moving the piston therein against said bearing and means for supplying pressurized media to said second cylinder at different times to said first mentioned supplying means for moving said second piston against said bearing.

3. A combination clutch and brake unit as claimed in claim 2 wherein the base of said cylindrical center portion is fixedly connected to said other cap and has an annular groove facing said other cap providing said first mentioned cylinder, said other cap has an annular groove in the base thereof facing said center portion providing said second cylinder and said pistons are each of an annular configuration with an extension extending towards said bearing.

4. A combination clutch and brake unit as claimed in claim 2 wherein a block is fixedly mounted on said drive shaft and said first mentioned disc is fixedly mounted on said block, a bearing is carried by said block and rotatably supports the inner end of said driven shaft and said block, plate and both discs are positioned within said cylindrical center portion.

References Cited
UNITED STATES PATENTS

| | | |
|---|---|---|
| 2,065,820 | 12/1936 | Mellon. |
| 2,205,989 | 6/1940 | Meyers et al. |
| 3,182,528 | 5/1965 | Lamburn _____ 192—18.1 XR |
| 3,174,350 | 3/1965 | Harnish et al. ____ 192—18.1 X |

BENJAMIN W. WYCHE III, *Primary Examiner.*